Dec. 30, 1930.　　　　G. MEISTER　　　　1,786,627
SUBMARINE LIFE SAVING DEVICE
Filed March 17, 1929　　　4 Sheets-Sheet 1

INVENTOR
GEORGES MEISTER
BY
ATTORNEY

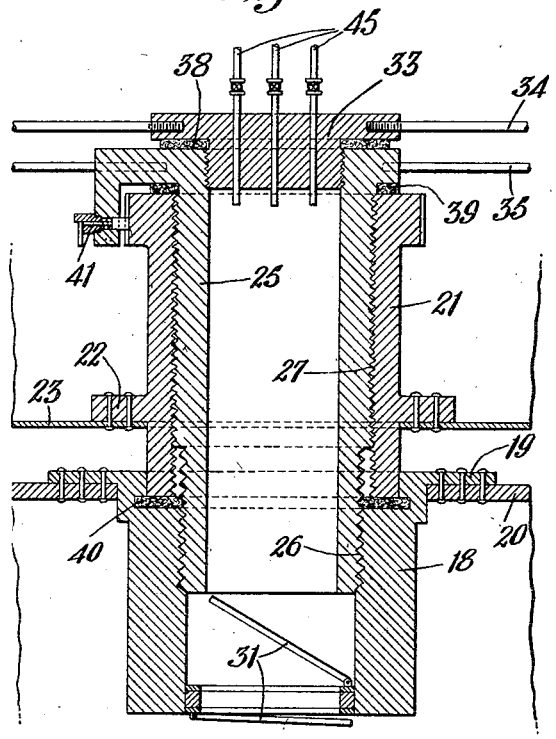
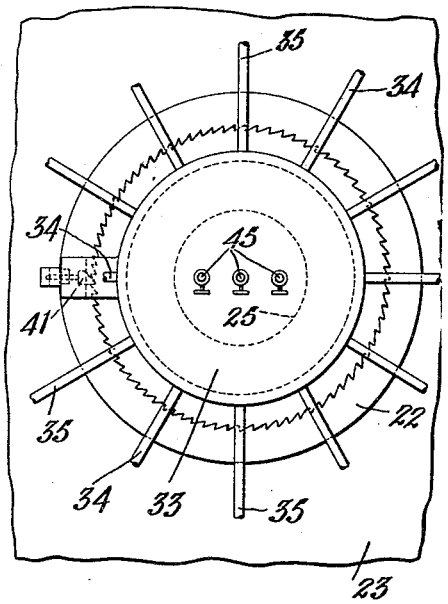
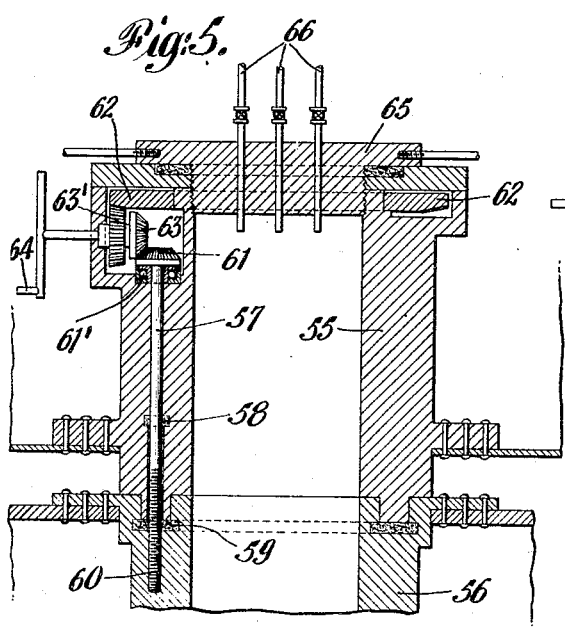

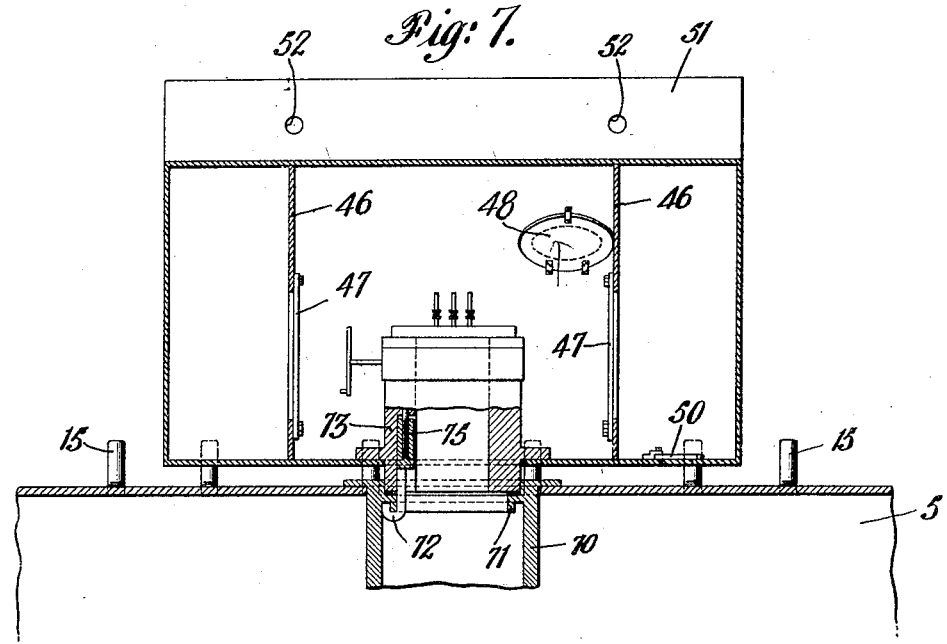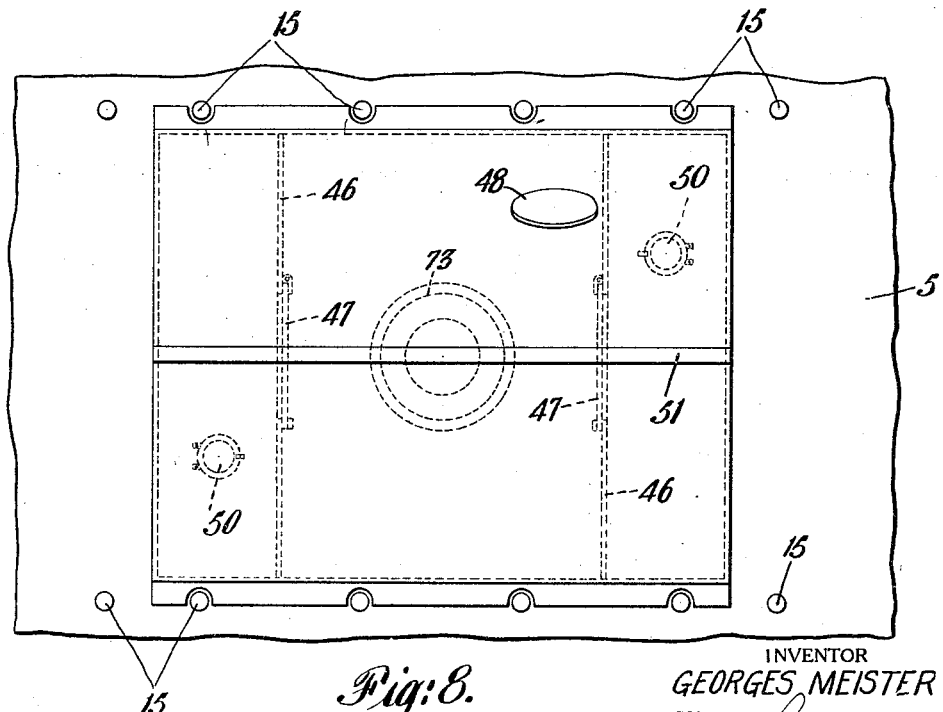

Dec. 30, 1930.  G. MEISTER  1,786,627
SUBMARINE LIFE SAVING DEVICE
Filed March 17, 1928   4 Sheets-Sheet 4
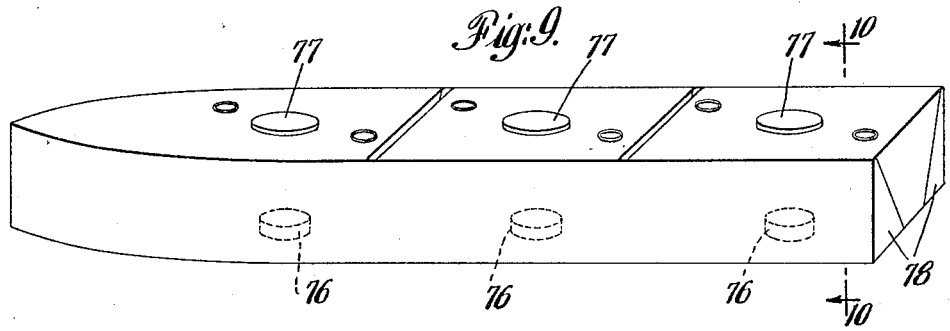
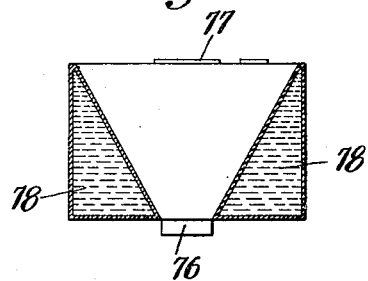
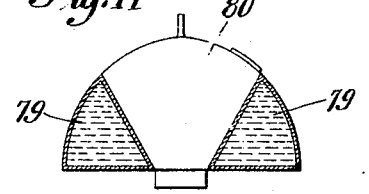
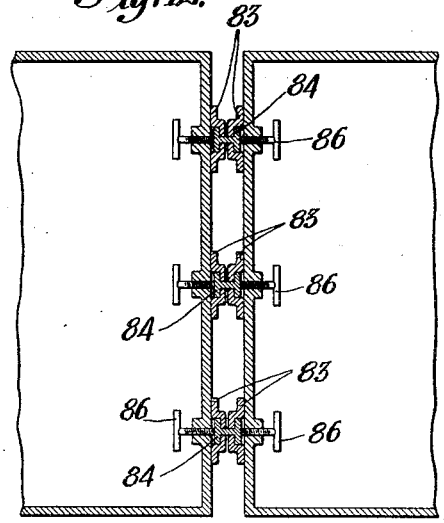
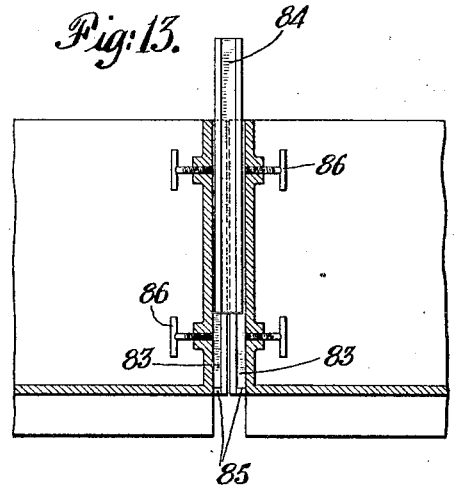
INVENTOR
GEORGES MEISTER
BY
ATTORNEY Patented Dec. 30, 1930

1,786,627

UNITED STATES PATENT OFFICE

GEORGES MEISTER, OF NEW YORK, N. Y.

SUBMARINE LIFE-SAVING DEVICE

Application filed March 17, 1928. Serial No. 262,570.

The present invention relates to submarines and has for an object to provide an improved means of escape from a disabled submarine, and improved means of egress and ingress for a diver. The problem of escape in case of accident is complicated by the fact that parts of the submarine or parts of the life saving equipment may be seriously damaged by the accident making escape necessary. The present invention provides an arrangement such that although parts of the submarine and parts of the life saving equipment may be seriously damaged, it will still be possible to escape.

The nature and objects of the invention will be better understood from a consideration of a selected embodiment for the purposes of which reference should be had to the accompanying drawing forming a part hereof and in which—

Figure 1:
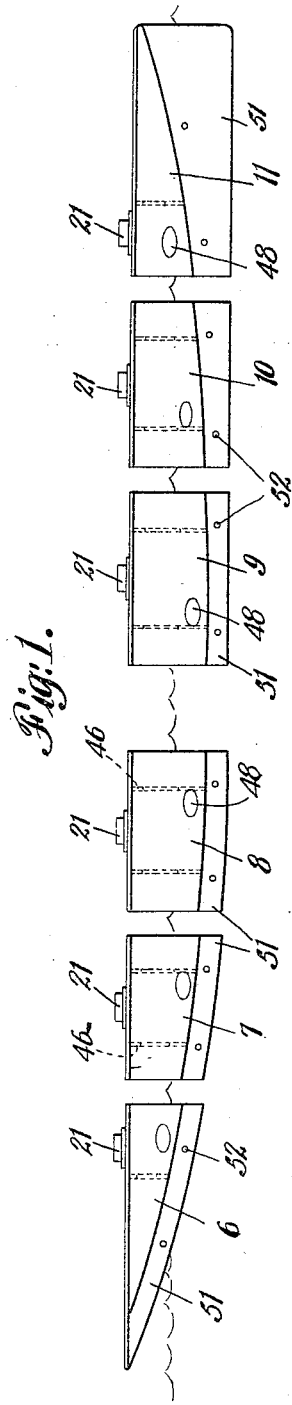
Figure 2:
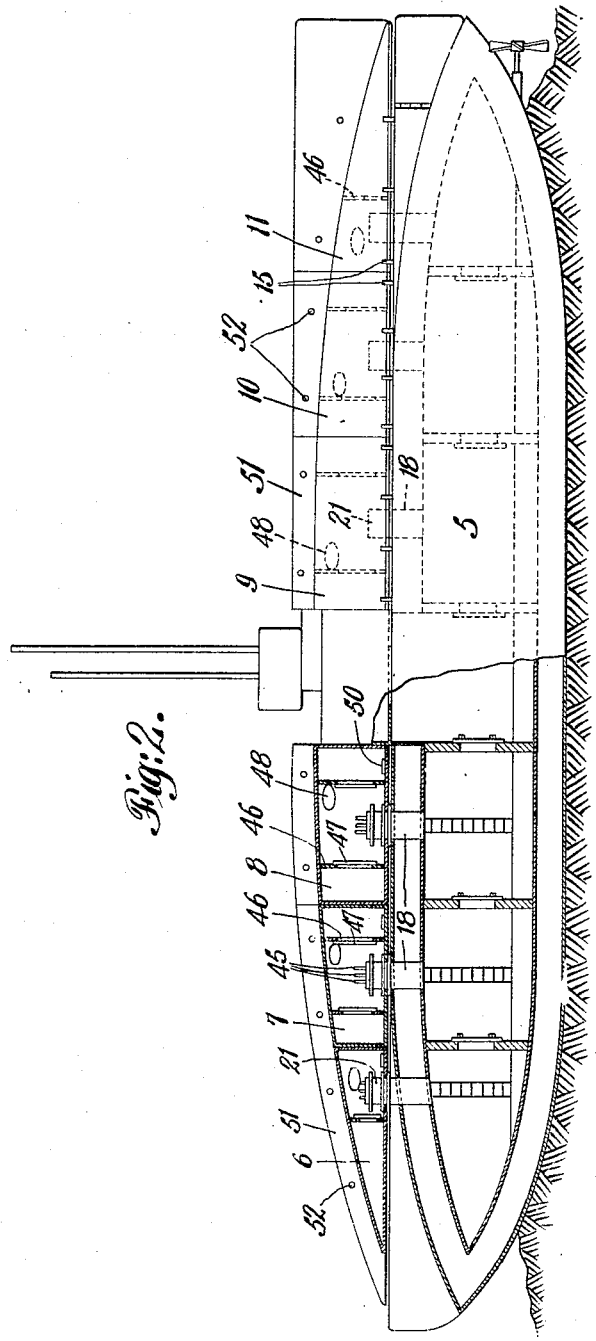

Figure 1 is a side view of a sectional lifeboat showing the sections in separated relation, Figure 2 is a side view partly in central section of a submarine with a sectional lifeboat secured thereto in inverted position, Figure 3 is a detail sectional view of an outlet connection between the submarine and lifeboat serving to provide a passageway and to secure the lifeboat to the submarine, Figure 4 is a plan view of the same, Figure 5 is a sectional view of another form of outlet, Figure 6 is a plan view of the outlet shown in Fig. 5, Figure 7 is a sectional view showing another form of outlet connection and showing also certain details of a lifeboat section, Figure 8 is a top plan view of the lifeboat section shown in Fig. 7, Figure 9 is a perspective view showing another form of a sectional lifeboat, Figure 10 is a sectional view taken on the line 10—10 of Fig. 9, Figure 11 is a sectional view showing another form of lifeboat, and Figures 12 and 13 are views showing means for connecting the lifeboat sections.

Referring more particularly to the drawings, the submarine 5 is shown as carrying a sectional lifeboat, the several sections of which are designated respectively 6, 7, 8, 9, 10 and 11. Each section may be considered as and may serve as a complete lifeboat in itself or the several sections may be secured together to form one complete lifeboat. The lifeboat sections are secured to the submarines in juxtaposed relation in two groups, one group before the conning tower and one aft of the conning tower, the sections being so constructed and arranged as to present a streamline contour. The sections although in juxtaposed relation are entirely free of each other, so that any one section may be detached for use independently of the other sections. As best shown in Fig. 8, each lifeboat section is secured against lateral displacement by means of a plurality of studs 15 secured in the submarine and engaging notches in horizontal flanges in the edge of the submarine sections. These studs are so shaped as to prevent lateral shifting but to permit vertical movement of the lifeboat section. A centrally disposed outlet connection between the submarine and each lifeboat section is arranged to provide access to the lifeboat from the submarine and to secure the lifeboat to the submarine detachably.

In the arrangement shown in detail in Fig. 3, a sleeve 18 is firmly secured by its flange 19 to the submarine shell 20 and a cooperating sleeve 21 is similarly secured by its flange 22 to the shell 23 of the lifeboat section. An inner sleeve 25 is threaded through the sleeve 21 of the lifeboat section and into the sleeve 18 of the submarine. Preferably and in the particular arrangement shown, the pitch of the threads 26 of the engagement between the inner sleeve 25 and the submarine sleeve 18 is greater than the pitch of the threads 27 between the sleeve 25 and the sleeve 21 of the lifeboat. By this arrangement the reverse rotation of the sleeve 25 separates the lifeboat from the submarine effectively and expeditiously. The sleeve 18 may be closed by either or both of two closure doors 30, 31 shown conventionally in Fig. 3. The upper end of the sleeve 25 is arranged to be closed by a threaded cap 33 in the upper end thereof provided with a plurality of outwardly extending bars 34 by which the same can be rotated.

The rods 35 may be used in the operation of rotating the sleeve 25 to release the lifeboat from the submarine. Suitable packing 38, 39 and 40 is provided between the parts to insure a water tight joint.

A ratchet device 41 is preferably arranged to hold the sleeve 25 in adjusted position in the sleeve 21 so that when once it is screwed tightly into position it will not accidentally loosen. Three pipes 45 extending through the cap 33 and provided with suitable valves provide for air connections from the interior of the submarine to a diver who is in or has passed outward through the lifeboat.

The lifeboat sections are reinforced by partitions 46 extending across the lifeboat and serving the double function of dividing the same into compartments and strengthening the shell thereof. Each section is also provided with a door 48 through the side wall of the shell in order that the section may be used as a trap and as a compression and decompression chamber to permit a diver in a suit to pass out into the water from within the submarine and to return as occasion may require.

The lifeboat sections are also provided with ports 50 which are closed by removable glass doors. These ports may be opened to give air when the lifeboat is on the surface and in upright position or they may be opened when the lifeboat is in position on the submarine to serve as a vent to permit water to be forced out of the lifeboat section after a diver has returned from the exterior, air being forced from within the submarine to force out the water.

It will be noted that each lifeboat section is provided with a keel section 51 and this keel section is, in turn, provided with apertures 52 to facilitate handling of the sections by means of cranes.

The arrangement shown in Fig. 5 answers the same purpose as that shown in Fig. 3 but differs in structural details. In this arrangement a sleeve 55 in the lifeboat is connectible to a sleeve 56 in the submarine to provide a passageway from the one to the other. The three threaded rods 57 in the sleeve 55 extend through suitable packings 58 and packings 59 and are threaded into the sleeve 56 as indicated at 60. The several rods 57 carry beveled pinions 61 at their upper ends and are arranged to be operated simultaneously from a ring gear 62 through pinions 63 which pinions, in turn, can be operated by cranks 64. Thrust bearings 61' resist the thrust on the shaft 57. The sleeves 55 are closed by screw caps 65 having air pipes 66 therein as in the case of the structure shown in Fig. 3.

The construction shown in Fig. 7 involves a slightly different method of securing the lifeboat to the submarine. In this construction the sleeve 70 of the submarine is provided with a flange 71 which is engaged by a hook 72 carried by the sleeve 73 of the lifeboat. These hooks 72 are engaged by threaded rods 75 of the lifeboat securing means, as in the case of the structure shown in Fig. 5.

The lifeboat instead of being of the form heretofore discussed may be of the form shown in Fig. 9 which shows three sections only of the lifeboat and not the complete boat. In this arrangement the lifeboat is right side up instead of being inverted and it provides a flat top deck.

The construction of the passageway 76 into the lifeboat from the submarine is substantially the same in this form as in the forms hereinbefore discussed. In this form a door 77 of any suitable construction is provided in the top to permit easy egress.

The addition of the lifeboat to the submarine obviously adds considerable buoyancy. It is advantageous under some conditions to provide tanks 78 along the side of the lifeboat secured to and forming a part of the submarine, which tanks may work in connection with the submarine water ballast tanks to compensate the variation of displacement for fast diving and raising. These tanks 78 are shown in Figs. 9 and 10 and will be sufficiently understood.

In Fig. 11 is shown an arrangement involving water tanks 79 extending along the sides of the lifeboat 80, this lifeboat being of the inverted type similar to the lifeboat first described.

In Figs. 12 and 13 is shown a suitable arrangement for securing the sections of the lifeboat together. As shown, the ends of the lifeboat sections are provided with slotted channel members 83 extending vertically at each end. Securing bars 84, H-shaped in cross section are adapted to be inserted in two alined channels of adjoining sections to secure said sections together. The bottoms of the channel members are formed with stops 85 to hold the securing devices. Suitable clamp screws 86 may be provided in each lifeboat section to clamp the securing devices in adjustable position.

The foregoing particular description is illustrative merely and is not intended as defining the limits of the invention.

I claim:

1. The combination with a submarine of a lifeboat secured thereon in inverted position and detachable therefrom, tubular members carried by said lifeboat and said submarine arranged to interengage to form a passageway between said submarine and said lifeboat together with means for closing one tubular member, air tubes extending through said closure member and a door through the side of said lifeboat whereby the lifeboat can be used as a trap to permit a diver to move to and from the submarine.

2. The combination with a submarine of a sectional lifeboat secured thereto in inverted position, each section of said lifeboat being arranged to be separately connected to said submarine and separately accessible therefrom, the lifeboat as a whole having a stream line contour, substantially as desecribed.

In testimony whereof, I have signed my name to this specification this 2nd day of March, 1928.

GEORGES MEISTER.